May 29, 1962 D. W. SOUZA 3,036,945

EMBOSSABLE PLASTIC ASSEMBLY

Filed Oct. 27, 1958

INVENTOR
DAVID W. SOUZA
BY
Gardner & Zimmerman
ATTORNEYS

United States Patent Office 3,036,945

Patented May 29, 1962

1

3,036,945
EMBOSSABLE PLASTIC ASSEMBLY

David W. Souza, Oakland, Calif., assignor to Dymo Industries, Inc., Berkeley, Calif., a corporation of California Filed Oct. 27, 1958, Ser. No. 769,643
4 Claims. (Cl. 154—53.5)

My invention relates, in general, to the production of reinforced plastic sheet and, more particularly, to a plastic sheet material from which reinforced plastic articles can be fabricated as well as to the methods of manufacture, fabrication and the articles of manufacture.

In utilizing rigid or semi-rigid thermoplastic resin sheet as well as other types of sheet plastic materials reinforcement is often found to greatly increase the utility and service life of the material. Ordinarily, reinforcement of such materials complicates production of finished articles, e.g., by providing usual type backings, etc. and especially when producing embossed articles.

I have now discovered a method for providing such a reinforcing backing utilizing pressure sensitive adhesive materials in especially devised constructions. Attendant benefits also accrue including provision of an adhesive surface for attachment to other surfaces and others noted hereinafter. The principles described herein are especially useful with the types of contrast color embossed rigid plastic sheet products and methods disclosed in my copending application, entitled Embossed Plastic Label and Method, Serial No. 696,100, filed November 13, 1957, now abandoned, and in the continuation in part of said application, now Patent No. 2,925,625.

Accordingly, it is an object of my invention to provide reinforced plastic structures and methods of manufacture utilizing pressure sensitive adhesive compositions.

A further object of my invention is to provide a laminated plastic sheet material including pressure sensitive adhesives from which reinforced plastic articles can be fabricated by simple operations.

A still further object of my invention is to provide a laminated plastic sheet material in which a pressure sensitive adhesive is employed to selectively attach and provide reinforcement to products fabricated from the material.

Another object of my invention is to provide a laminated plastic sheet or tape including a pressure sensitive adhesive from which reinforced embossed articles may be produced by cold deformation in cold drawing or embossing dies.

Still another object of my invention is to provide methods for producing reinforced embossed rigid thermoplastic resin articles from a laminated plastic sheet or tape by cold deformation as by means of embossing dies.

The invention possesses other objects and features of advantage, some of which, with the foregoing, will be set forth in the following description of the preferred form of the invention which is illustrated in the drawing accompanying and forming part of the specification. It is to be understood, however, that variations in the showings made by the said drawing and description may be adopted within the scope of the invention as set forth in the claims.

Referring to said drawing.

Figure 1:
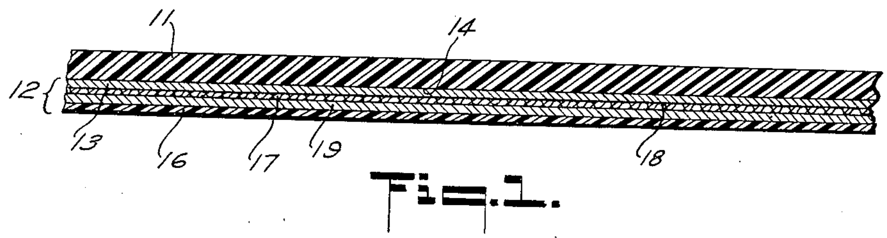
FIGURE 1 is a cross-sectional view of a laminated plastic sheet or tape constructed in accordance with the present invention.

In brief, sheeted material which is to be subjected to fabrication is provided, in accordance with my invention, with a composite laminated backing including one or more layers of pressure sensitive adhesive. One of said layers is disposed in contact with said sheeted material and an optionally detachable backing is provided. Upon forming, as by embossment, the pressure sensitive adhesive remains attached to the formed material providing support and serving various purposes as hereinafter described.

2

Materials which may be reinforced in accordance with the invention are those normally possessing ductibility and physical properties which permit of considerable "cold flow" or visco-elastic elongation during forming. Materials with which especially beneficial and useful effects are produced are rigid and semi-rigid thermoplastic resin sheets for which the yield point occurs at a low degree of elongation and further elongation occurs with permanent, i.e., cold flow, deformation. Materials with a substantial "rubbery" type of elasticity are not generally suitable.

Typical of suitable plastic materials are the rigid polyvinyl chloride polymers and polyvinyl chloride-polyvinyl acetate copolymers. These materials are compounded with one or more lubricants, stabilizers, small amounts of low softening power plasticizers or extenders, dyes, pigments including fillers and the like. Following preliminary mixing and at least partial fusing as in a Banbury mixer, operated at temperatures of about 250° F.–350° F., the vinyl compounds are sheeted at elevated temperatures on calenders and are cooled yielding annealed, clear or opaque, sheets having various surface finishes, e.g., smooth, matte, and patterned according to formulative composition and finish of the calender rolls. Planishing press treatments yield similar products. The contrast color embossing rigid plastic stocks produced as described in the aforesaid copending applications are prepared somewhat similarly but are formulated and processed to yield an annealed sheet having clear or other normal uniform color; however, upon deformation as in cold embossing dies to produce elongation beyond the yield point a whitish or other color strongly contrasting with the normal background color develops in the deformed areas of the sheet. The development of the contrast color is believed to be due to a change in the fine structure of the sheet caused by the cold flow deformation to yield a structure having highly modified diffractive values. Such plastic materials are usually cut or slit into sheets, cards or tapes which are packaged into bundles or wound on spools as required for distribution or processing. The embossment stacks, for example, are prepared in spooled tape form and are embossed in the type of dies such as those employed with soft metal tape. A variety of suitable embossable rigid vinyl sheeting materials are sold by the Bakelite Corporation including standard formulations such as VSA 3381, VCA 3300, etc., in various colors. Thicknesses from a few thousandths of an inch upwards to 50–100 or more may be employed, although the thinner materials are benefited to a greater extent insofar as reinforcement is concerned.

Such sheeted form materials are provided with the reinforcing backing either subsequent to sheeting in the manufacturing process or before fabrication as convenience or purpose dictates. As shown in FIGURE 1 of the drawing, sheet material 11, e.g., an embossible tape is assembled together with a laminated backing 12. The laminated backing 12 includes as an essential element a layer 13 of a pressure sensitive adhesive disposed in adhesive contact with the lower surface 14 of sheet 11. Likewise the backing 12 includes a supporting sheet layer 16 which is easily detachable from adhesive portions of the backing layer and which servies to carry and protect the laminated backing prior to use, While such a simple backing arrangement may be employed, it is generally preferred to employ a fabric or fiber layer 17 impregnated with adhesive and disposed in contact with the lower surface 18 of adhesive layer 13 and to provide a second layer 19 of pressure sensitive adhesive between fabric layer 17 and support layer 16. Additional alternate layers of fabric and adhesive may be provided as required for additional reinforcement or other purposes as desired.

For reasons which will be apparent hereinafter the pressure sensitive adhesive must possess a relatively very high degree of adhesiveness for the fabric layers to assure integrity of the backing. Thenceforth, the tenacity of the contact between layer 13 and sheet 11 must be relatively greater than that which exists between layer 19 and supporting layer 16 and it is desirable that layer 16 release freely from adhesive layer 19 in the manner characteristic of pressure sensitive adhesives at least wherever it is desired to employ the adhesive property for attachment. In an overall sense it is essential that adhesive layer 13 becomes strongly attached to sheet 11 at least during fabrication and in the instance immediately preceding, that a selective adhesiveness for sheet 11 is exhibited relative to suporting layer 16.

The establishment of the foregoing relations may be accomplished in several ways. Adhesive layer 13 may be selected or formulated to possess a strong wetting or adhesive affinity for sheet 11. The same adhesive may be employed as layer 19 but then support layer 16 may be of a different material having a lesser affinity for the adhesive. Alternatively, backing layers (not shown) may be employed between the adhesive and adjacent surface to either increase or decrease the affinity as indicated. An excellent arrangement is obtained, for example, if sheet 11 is of a rigid vinyl sheet material and support sheet 16 is of polyethylene plastic which inherently possesses less affinity for an adhesive than does a plastic such as vinyl which contains many polar groups.

Pressure sensitive adhesives suitable for present purposes may be prepared quite similarly to those employed for various other purposes. Such materials are normally prepared from natural rubber or butadiene-styrene copolymers (Gr S, Buna S) with varying proportions of natural or synthetic resins, antioxidants, plasticizers, mineral fillers, etc., in accordance with widely practiced techniques. Certain acrylic, methacrylic and vinyl polymers have likewise been employed. The rubber or polymer imparts cohesiveness and strength to the adhesive as well as flexibility and influencing parting properties. Tackifying resins in selected proportions are included to determine the adhesiveness and materials including rosin, dehydrogenated and hydrogenated rosin, terpene polymers, hydrogenated coumarone-indene resins, pine tar and methyl ester of hydrogenated rosin (Heroclyn) among others may be used. Many of these resins are known to possess somewhat specific wetting power and therefore can be employed to impart the desired selective wetting power of layers 13 and 19 by selection either as to the nature of the polymer or of the resin as well as by varying the proportion of resin. Resin in amounts of 25%–100% by weight of the polymer are customarily employed, with larger proportions being the more adherent.

The laminated backing 12, is produced from a pressure sensitive adhesive of the character described by adding a volatile solvent to produce a mixture which is spread on one side and impregnated into fabric layer 17 yielding adhesive layer 13 thereon. Adhesive layer 19 of the same or a different composition as indicated above is then applied on the opposite side of the fabric layer. Subsequently the solvent is evaporated, preferably, not quite completely leaving the adhesive layers in an easily deformable state and supporting layer 16 is applied so that the laminated backing can be rolled or spooled. Fabric or fiber layer 17 is of a weave or texture, e.g., tissue-like cellulosic, or plastic fiber cloth, which may be distorted to a high degree. The backing 16 may be of a plastic such as polyethylene which likewise may be deformed to a high degree; however, a ductile metal foil such as aluminum provided with a parting agent or otherwise being made detachable from adhesive 19 might also be employed. Hot calendering may be used also with more difficulty than the solvent spreading method described above for applying the laminated backing. The thickness of the laminated backing 12 is preferably less than that of sheet 11. With a 0.012″ plastic sheet 11, adhesive-fabric laminations from about 0.005″ to 0.010″ have been successfully employed.

Figure 2:
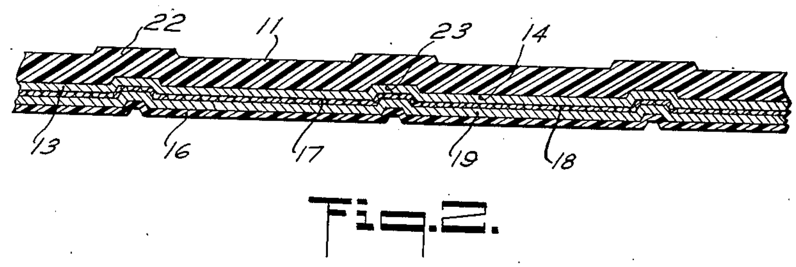
FIGURE 2 is a cross-sectional view of a laminated plastic sheet such as that shown in FIGURE 1 subsequent to an embossing operation.
Figure 3:
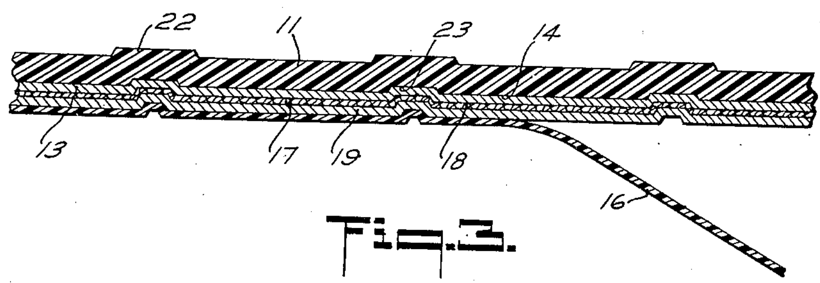
FIGURE 3 is a cross-sectional view of the embossed sheet shown in FIGURE 1 with the lower cover layer of the laminated structure partially removed to expose a pressure sensitive adhesive surface.

In practice, attachment of the backing to the sheet as shown in FIGURE 1 provides immediate support; however, detachment of support layer 16 as indicated in FIGURE 3 and attachment to another surface, especially, porous surfaces permits evaporation of residual solvent and other hardening processes to occur in the adhesive layers. Upon embossment as indicated in FIGURE 2, to provide projections 22 and indentations 23 to the sheet 11, the laminated backing 12 is distorted along with the sheet 11 so that areas thinned by the drawing operation as well as other portions of the assembly are reinforced by the laminated backing clinging to the indented surfaces. As will be noted, the male embossing die engages the exposed surface of sheet 16 while the female die engages the exposed surface of sheet 11.

Certain other benefits are also obtained. The backing tends to act as a mobile agent which equalizes or eases peak stresses produced in the drawing operation. Moreover, the adhesive layer can be pigmented so that if a clear or transulcent contrast color embossment stock is used as sheet 11, convenient selection of the background color may be effected utilizing a single embossment stack and a selection of vari-colored backings. With clearer translucent adhesive-fabric layers, the support sheet can be colored or metallized for similar purposes. Of course the support sheet can also be detached and the backed assembly attached to colored surfaces for similar purposes.

What is claimed is:

1. An assembly for use in the production of a cold embossed article, comprising a ductile plastic sheet having an original substantially uniform surface color, said sheet having a molecular structure so that upon deformation thereof beyond its cold yield point, by cold embossing, such sheet produces a cold flow in the embossed stressed area and a distorted portion in such area possessing a different light refraction than that of the sheet, and said distorted portion will possess a white color contrasting with said original sheet color, a layer of pressure sensitive adhesive attached to one surface of said sheet, and a detachable protective backing removably adhered to the exposed surface of said adhesive layer.

2. An assembly as set forth in claim 1 in which said plastic sheet is a material selected from the group consisting of polyvinyl chloride and copolymers of polyvinyl chloride.

3. An assembly for use in the production of a cold embossed reinforced sheet or tape fabrication comprising a ductile rigid plastic sheet possessing a substantially uniform color, said sheet having a molecular structure characterized in that upon deformation beyond its cold yield point, upon cold embossing, such sheet produces a cold flow in the embossed stressed area and a distorted portion in such area possessing a different light refraction than that of the sheet, and said embossed distorted portion will be contrasted in color to the uniform color of said sheet, a layer of pressure sensitive adhesive attached to one surface of said sheet or tape, and a detachable backing sheet layer removably adhered to the exposed surface of said adhesive layer.

4. An assembly as set forth in claim 3 in which said assembly is in the form of a continuous roll.

(References on following page)

References Cited in the file of this patent

UNITED STATES PATENTS

| | | |
|---|---|---|
| 1,346,360 | White | July 13, 1920 |
| 2,030,066 | Jenett | Feb. 11, 1936 |
| 2,096,389 | Bode | Oct. 19, 1937 |
| 2,133,914 | Burke | Oct. 18, 1938 |
| 2,475,375 | Clark | July 5, 1949 |
| 2,578,709 | Lyijynen | Dec. 18, 1951 |
| 2,629,678 | Thompson | Feb. 24, 1953 |
| 2,700,630 | Bukey et al. | Jan. 25, 1955 |
| 2,996,822 | Souza | Aug. 22, 1961 |